(12) United States Patent
Jimison

(10) Patent No.: US 6,718,590 B1
(45) Date of Patent: Apr. 13, 2004

(54) METHOD AND APPARATUS FOR CLEANING AND POLISHING FRUITS AND VEGETABLES

(76) Inventor: James W. Jimison, 360 Fulton St., Palo Alto, CA (US) 94301

( * ) Notice: Subject to any disclaimer, the term of this patent is extended or adjusted under 35 U.S.C. 154(b) by 0 days.

(21) Appl. No.: 09/476,039

(22) Filed: Dec. 31, 1999

Related U.S. Application Data

(63) Continuation-in-part of application No. 08/825,491, filed on Mar. 28, 1997, now Pat. No. 6,049,938, which is a continuation-in-part of application No. 29/037,144, filed on Apr. 5, 1995, now Pat. No. Des. 383,576, and a continuation-in-part of application No. 29/037,145, filed on Apr. 5, 1995, now Pat. No. Des. 381,145, which is a continuation-in-part of application No. 08/080,660, filed on Jun. 18, 1993, now abandoned.

(51) Int. Cl.⁷ .......................... B65D 33/16; B65D 33/04; B65D 30/08
(52) U.S. Cl. .................. 15/210.1; 15/3.1; 15/209.1; 383/63; 383/106; 383/109
(58) Field of Search .......................... 15/209.1, 210.1, 15/21.2; 383/106, 109, 111

(56) References Cited

U.S. PATENT DOCUMENTS

| | | |
|---|---|---|
| 1,181,148 A | 5/1916 | Linton et al. |
| 1,681,922 A | 8/1928 | Boch |
| 1,871,827 A | 8/1932 | Hulst |
| 2,080,402 A | 5/1937 | Herman |
| 2,530,746 A | 11/1950 | Wetherby |
| 2,674,289 A | 4/1954 | Silverman |
| 3,312,337 A | 4/1967 | Martin |
| 3,406,419 A | 10/1968 | Young |
| 3,485,281 A * | 12/1969 | Wicks |
| 3,495,764 A | 2/1970 | Crane |
| 3,547,340 A * | 12/1970 | McDonald |
| 3,734,394 A * | 5/1973 | Dooley |
| 3,806,983 A | 4/1974 | Cunningham et al. |
| 4,144,886 A | 3/1979 | Holst et al. |
| 4,185,673 A | 1/1980 | Daniello |
| 4,222,422 A * | 9/1980 | Lofberg |
| 4,321,756 A | 3/1982 | Mosely |
| 4,521,030 A | 6/1985 | Vance |
| 4,629,064 A | 12/1986 | Barner |
| 4,658,989 A * | 4/1987 | Bonerb |
| 4,756,422 A | 7/1988 | Kristen |
| 4,781,472 A * | 11/1988 | LaFleur |
| 4,861,632 A | 8/1989 | Caggiano |
| 4,890,936 A | 1/1990 | Cooper |
| 4,944,051 A | 7/1990 | Porter |
| 4,971,454 A | 11/1990 | Branson et al. |
| 4,984,907 A | 1/1991 | Power |
| 5,007,233 A * | 4/1991 | Bose |

(List continued on next page.)

FOREIGN PATENT DOCUMENTS

| | | |
|---|---|---|
| CA | 469025 | 10/1950 |
| CA | 933002 | 9/1973 |
| EP | 0158361 | * 10/1985 |
| EP | 0523706 | * 1/1993 |
| FR | 1441107 | 4/1966 |
| GB | 2163724 | 3/1986 |
| NO | 97451 | 2/1961 |

*Primary Examiner*—Randall Chin
(74) *Attorney, Agent, or Firm*—Carol D. Titus; James J. Leary

(57) ABSTRACT

A method and apparatus for cleaning and polishing products, including fruits and vegetables, in which the product is placed in a specially constructed cleaning bag and oscillated. The rolling motion of the product cleans and polishes the surfaces of the product. The bag has a lining especially selected for the purpose and is designed for occasional replacement of the lining or temporary removal for cleaning purposes. In one embodiment, the bag features an elastic section that accommodates various sizes of loads.

24 Claims, 8 Drawing Sheets

U.S. PATENT DOCUMENTS

| | | |
|---|---|---|
| 5,035,517 A | 7/1991 | Edelman |
| 5,078,508 A | 1/1992 | Johan et al. |
| 5,168,909 A | 12/1992 | Joyner, Jr. |
| 5,237,838 A * | 8/1993 | Merritt-Munson |
| 5,284,703 A | 2/1994 | Everhart et al. |
| 5,529,396 A * | 6/1996 | Pryor |
| 5,601,542 A | 2/1997 | Melius et al. |
| 5,603,995 A | 2/1997 | Takubo et al. |
| 5,711,609 A | 1/1998 | Simonsen |
| 5,814,567 A | 9/1998 | Yahiaoui et al. |

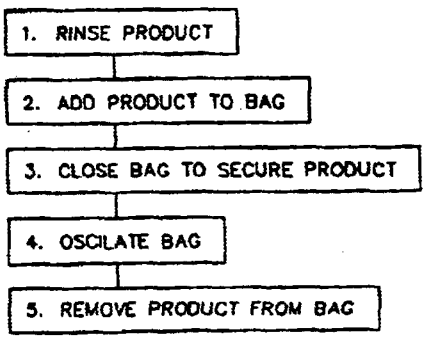
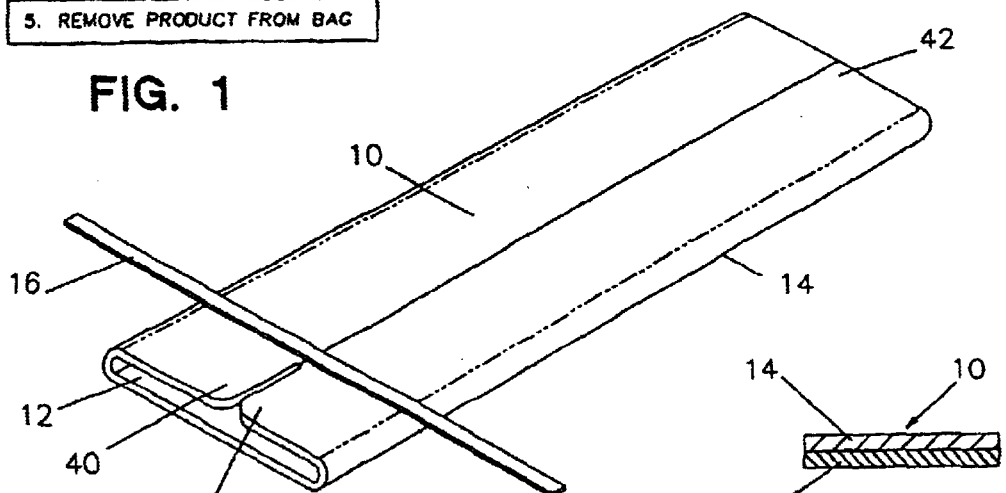
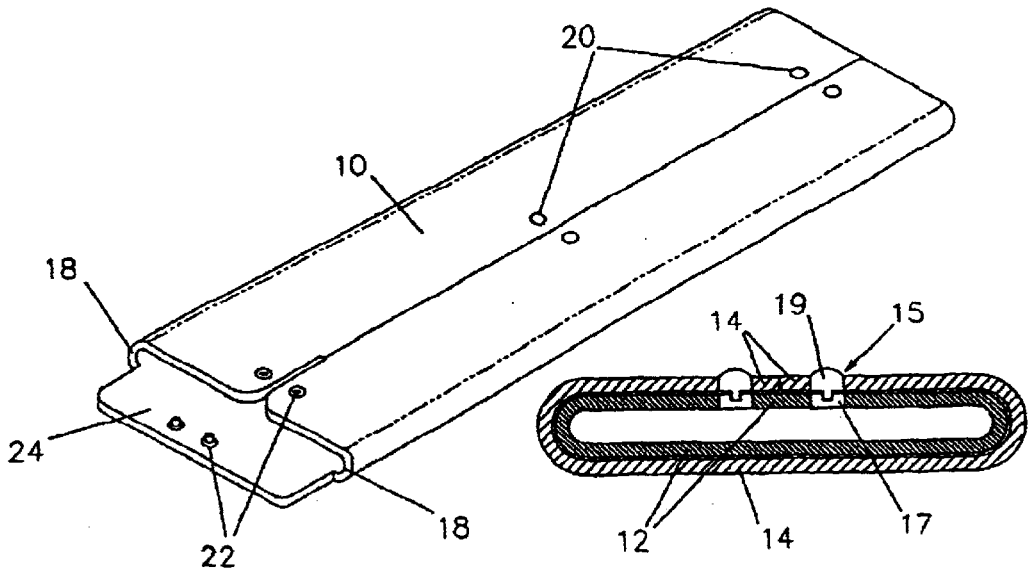

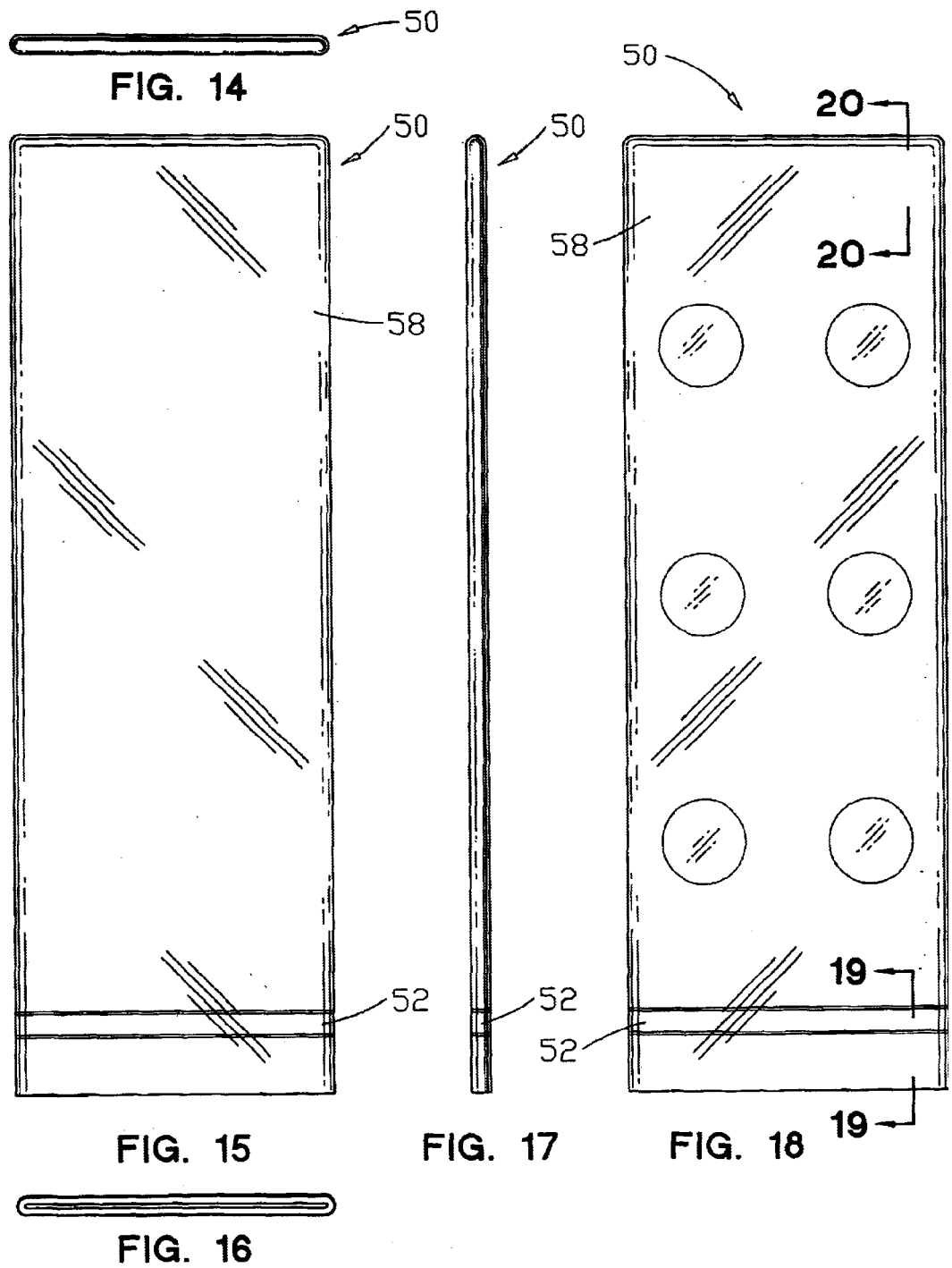

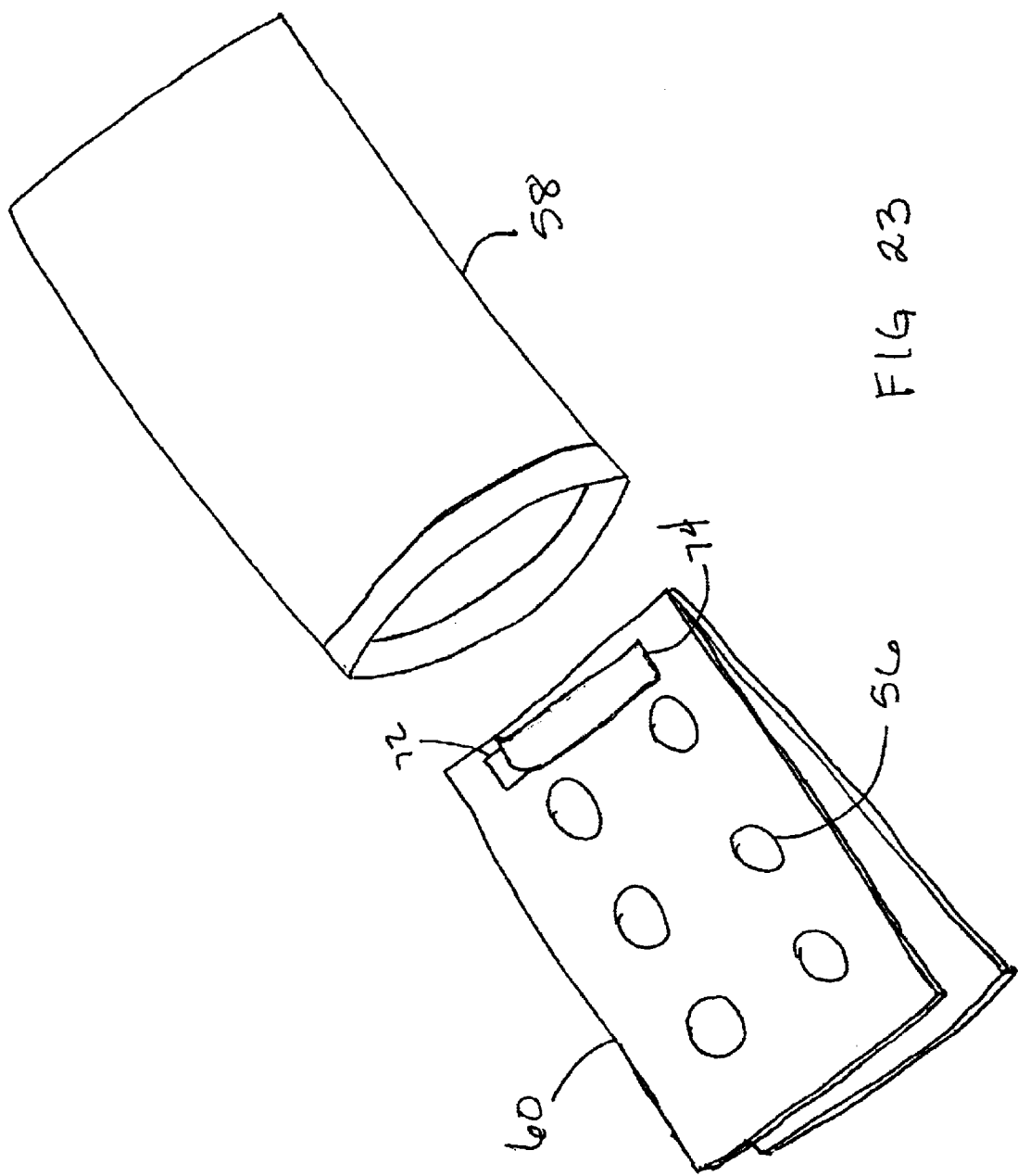

METHOD AND APPARATUS FOR CLEANING AND POLISHING FRUITS AND VEGETABLES

CROSS-REFERENCE TO OTHER APPLICATIONS

This application is a continuation-in-part of application Ser. No. 08/825,491, filed Mar. 28, 1997, now U.S. Pat No. 6,049,938, which is a continuation-in-part of application Ser. No. 29/037,144 and 29/037,145 now patent numbers D383,576 and D381,145, both filed Apr. 5, 1995, and both of which are continuations-in-part of application Ser. No. 08/080,660, filed Jun. 18, 1993, now abandoned.

FIELD OF THE INVENTION

This invention relates to devices for cleaning and polishing fruits, vegetables or other products. More particularly, it relates to a specially constructed cleaning bag into which the products are placed and shaken, in an end-to-end oscillatory motion, to clean and polish them.

BACKGROUND OF THE INVENTION

The marketing and culinary appeal of most all fruits and vegetable depends on their appearance. Therefore extensive technology has been disclosed for washing and preparing product for the marketplace.

U.S. Pat. No. 4,990,351 to Orman et al. discloses a method involving simultaneously scrubbing the product with brushes while drenching the product with a falling liquid containing an aqueous fungicide with a controlled pH. The process is performed in order to clean the fruit while simultaneously depositing a fungicidal coating on the surface of the product.

U.S. Pat. No. 4,204,291 to Chooijian et al. is for an apparatus to remove mold and other detritus from raisins in which the raisins are subject to a shower and an oscillatory agitation on a conveying system in which the raisins are conveyed in one direction on a conveyor belt which is textured to carry the debris in the opposite direction.

The foregoing disclosures are examples of operations that are performed on products on a commercial scale. Operations of this type do not satisfy the interests of the homemaker because, in many instances, fungicides or thin coatings are deliberately left on the product in order to preserve the product during its transport through the market place to the household. Consequently, homemakers spend considerable effort in washing products in order to render the products safer for consumption by their families. A number of devices have appeared in the market to facilitate this practice.

U.S. Pat. No. 4,321,756 to Mosely discloses a drying apparatus consisting of a net bag placed inside an outer imperforate plastic film bag. The product to be dried is placed inside the net bag. The two bags containing product are held together and manually rotated or swung so that water is slung off of the product by centrifugal force and collected in the outer imperforate bag. The inner bag may be a net material or, alternatively, an absorbing material such as terry cloth.

U.S. Pat. No 4,944,051 to Porter discloses a net bag with rings for attachment to a faucet such that the bag with product to be washed can be suspended from the faucet with water running over the product while the user manually manipulates the contents of the bag to ensure thorough washing.

Appearance is a function not only of the cleanliness of the product but also the degree of polish that has been developed on the surface of the product. Discolored products resulting from application of chemicals is not completely removed by simply washing the product such as is often done by the homemaker. Remnants of these chemical not only leave the product in an unattractive condition, but also pose a health problem. Many homemakers are well aware of the health problems associated with ingesting a product that has not been completely cleaned and tend to equate appearance of the product with exposure to health problems.

SUMMARY OF THE INVENTION

It is an object of this invention to provide a method and apparatus for cleaning and polishing fruits and vegetables. The method is particularly directed toward small fruits and vegetables that are eaten whole or with the skin or peel intact. Examples of such vegetables and fruits are tomatoes, radishes, apples, grapes, cherries, kumquats, etc. The inventor also recognizes that such a method and apparatus would also be useful for other non-food products, for instance golf balls, stones or marbles, therefore the items to be cleaned will be referred to generically as "products" which should be understood to include food and non-food items. It is another object of this invention to generate a polished and otherwise attractive appearance of the product. It is another object that the practices of this invention be convenient to the homemaker in the typical home environment. It is also an objective to strip the product of stems leaves, etc. It is also an object to provide a device that is convenient to clean.

This invention is directed toward the steps including rinsing off loosely adhering debris, then placing the product in a container which has a lining specially selected for the purpose, then oscillating the container with the product inside for an appropriate number of cycles, then removing the product. After a sufficient number of oscillations, depending on the type and condition of the product, the product is removed from the container.

Access of individual members of the product to the interior lining of the product is an important parameter for successful performance of the method. Therefore, the ratio of the surface area of the product to the interior wall of container must not exceed a value depending on the product. For example, for grapes or small tomatoes, the container should not be filled more than about 25% full. Furthermore, sufficient contact of the lining and skin of the product requires that the interior of the container be elongated with the cross sectional area of the interior comparable to the cross sectional shape of the members of the product. Therefore, with appropriate end-to-end manual oscillatory motion, this shape provides a rolling motion to the members of the product with resultant rubbing of the surface of the members against the lining.

The container of this invention has a lining and design appropriately selected for the purpose. The design of the bag is such as to provide convenient loading and unloading of product to and from the interior of the bag. The preferred lining of the container is thin absorbent paper or fiber composite, however a number of linings are effective for the purpose such as a terry cloth or other fabrics and materials. Another requirement is that the interior lining of the bag be conveniently accessible for occasional cleaning. Another advantageous feature is that the bag have dimensions of cross sectional area that are adaptable to the size of the members of the product being cleaned.

In one embodiment, access to the lining is provided by a construction in which a zipper extends from one end to the other end of the bag. Closable openings at each end of the bag for filling and emptying the product members are provided for quickly loading or unloading product. In another embodiment, an elastic section in the bag provides that the bag will be contracted to accommodate smaller members of product such as grapes or cherries but is expanded to accommodate larger product members such as apples or pears.

In another embodiment a rectangular wire frame has one end with hooks that may be secured inside and to one end of the lining and a handle outside the other open end of the lining. When it is required to clean the lining, the wire frame is withdrawn from the bag thereby withdrawing the lining from the inside of the outer bag and turning the bag inside out for convenient cleaning. After cleaning, the end of the frame with one end of the lining attached is "poked" back into the outer bag cover to resume the cleaning and polishing operation. The open end of the bag is provided with ties for attachment to the rail.

BRIEF DESCRIPTION OF THE DRAWINGS

FIG. 1 is a flow diagram of the method of the invention.

FIG. 2 is an embodiment of the apparatus of the invention.

FIG. 3 is a sectional view of the apparatus of FIG. 2.

FIG. 4 shows the apparatus with snaps.

FIG. 5 is a sectional view of FIG. 4.

FIG. 14 is a rear view.

FIG. 15 is a top view.

FIG. 16 is a front side view.

FIG. 17 is a right side view.

FIG. 18 is a bottom view.

FIG. 23 shows an alternate embodiment formed of two separate pieces.

DETAILED DESCRIPTION OF THE INVENTION

Figures 6, 7:
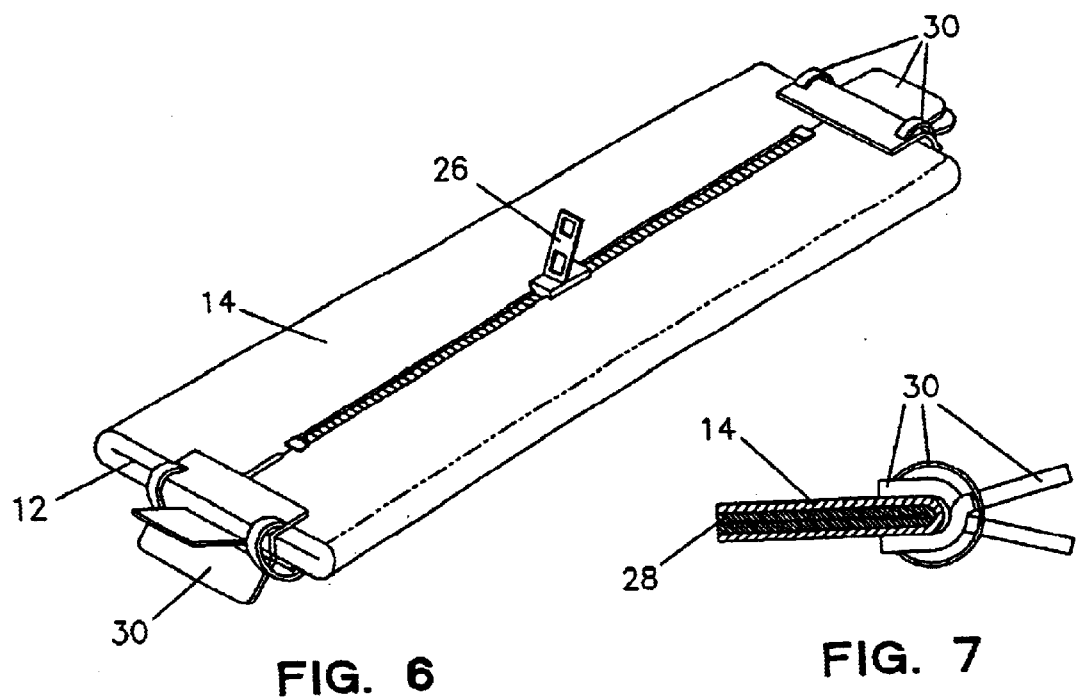
FIG. 6 shows the apparatus with a zipper closure.
FIG. 7 is a sectional view of FIG. 6.

The following paragraphs present several variations and modifications of the invention, including what the inventor presently believes to be the best mode for carrying out the invention.

Turning now to a discussion of the drawings, FIG. 1 is a flow diagram illustrating the steps in performing the method of this invention.

In step 1, the members of product are rinsed to remove loose debris.

In step 2, the product is placed in an elongated bag-like container having an appropriate liner. The liner is preferably an absorbent material and is abrasive to a degree that is dependent on the product. Liners that have performed satisfactorily include absorbent paper and fabric composite materials, terry cloth, sponge, fabric having a nap or bristles that confers a brush-like texture to the surface. The bag is preferably filled to not more than 25% capacity.

In step 3, the product is secured inside of the cleaning bag by closing the opening or openings of the bag with the closures provided.

In step 4, the bag is oscillated in a direction parallel to the long dimension of the bag. Approximately ten or so oscillations are recommended for most situations.

In step 5, the bag closures are opened and contents are removed from the bag. A slit extends about an inch from the lip of the opening toward the other end of the bag allowing the user to pour the product from the bag into a serving container without touching the fruit with his hands.

FIG. 2 shows a bag 10 generally having an elongated shape for practicing the invention. A cross section of the bag 10 is shown in FIG. 3. The bag includes an interior lining 12 that is preferably thin absorbent paper or fiber composite or lintless terry cloth and an exterior wrap 14 that is selected for its resistance to soiling. The exterior wrap 14 is preferably a plastic sheet, but may be made of cloth or paper. At least one end of the bag 10 is provided with a tie string 16. The open end of the bag has a slit at the opening with tabs 40. The user holds the end 42 of the bag to tip the bag 10 and empty its contents into the serving dish.

FIGS. 4 and 5 show a second embodiment of the apparatus. FIG. 5 is a sectional view of FIG. 4. The bag 10 includes an outside plastic wrap 14 joined to an interior terry cloth lining 12 by snaps 15. The outer wrap 14 is formed by folding opposite edges of a single sheet together and securing the folds 18 by appropriately placed snaps 15. The female part 17 of the snap 15 is secured in the cloth and the male part 19 is secured in the outer wrap 14 as shown in FIG. 5. The end snaps 22 serve to close the end flap 24 for loading and unloading product FIG. 6 shows an embodiment including a zipper 26 in the outer wrap permitting removal of a disposable paper lining 28. The paper lining (which could be disposable paper) is shown in FIG. 7 temporarily secured in its position inside the wrap 14 by clamps 30.

The paper used in these embodiments is preferably a coarse absorbent paper with good wet strength. For these purposes, SINGLE FOLD TOWEL 755 or ROLL TOWEL 1275 sold by the Kraft Co. is preferred.

Figure 8:
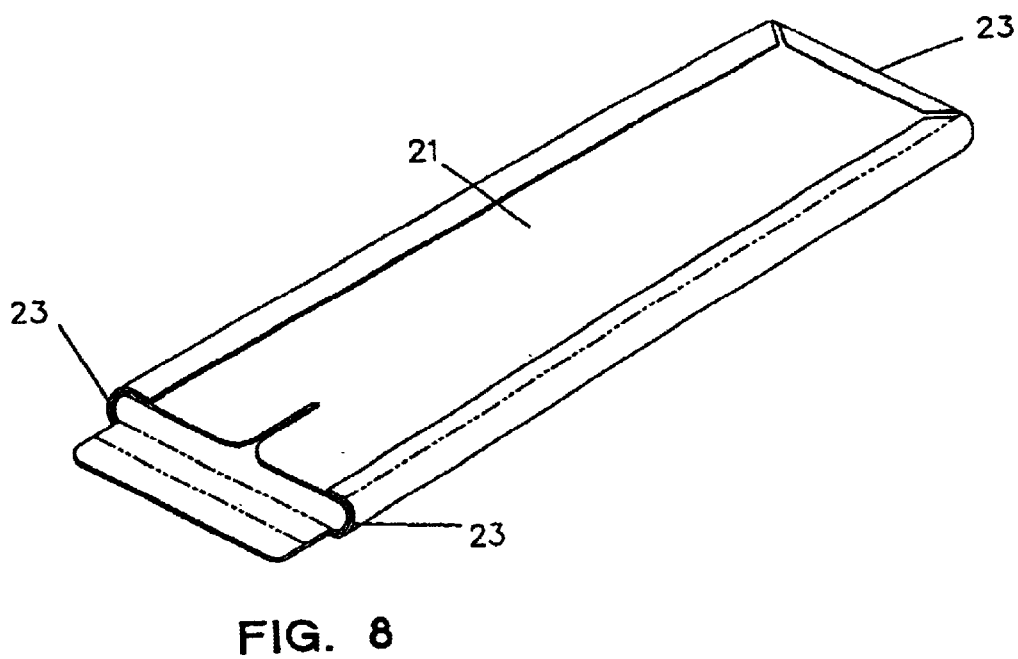
FIG. 8 is another embodiment of the apparatus.

FIG. 8 shows an embodiment that uses a heavy disposable paper lining (not shown) enclosed within a thin plastic or paper cover 21. In FIG. 8, the cover 21 is shown folded around the edges 23.

Figure 9:
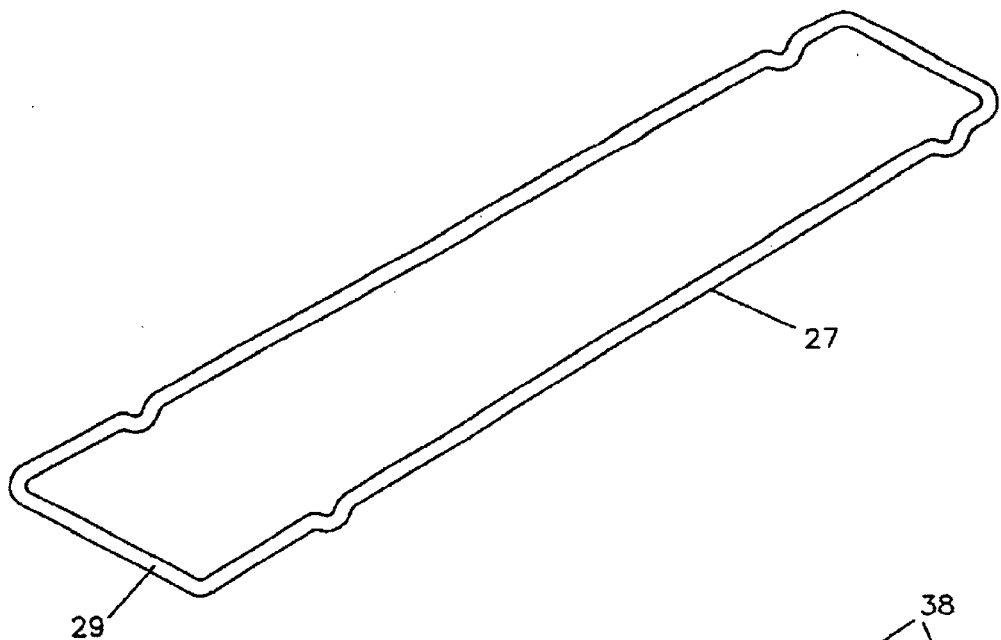
FIG. 9A shows a wire frame for oscillating the bag.
FIG. 9B shows the wire frame of FIG. 9 B with bag attached.
Figure 9:
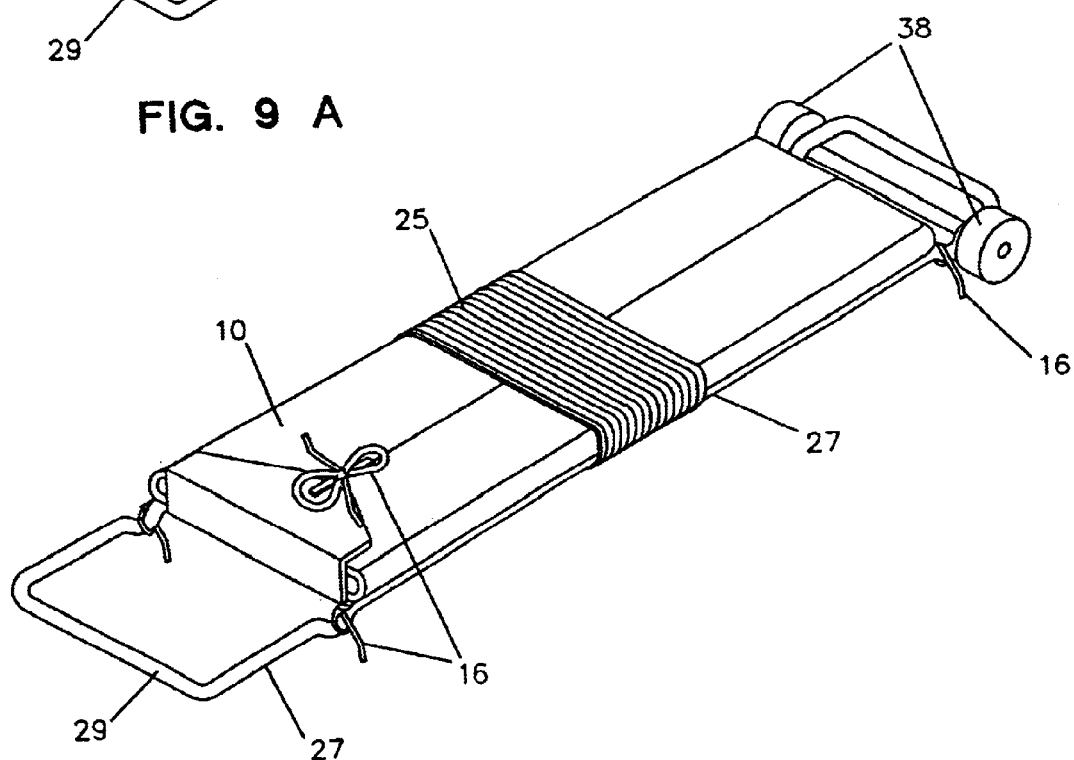

FIGS. 9A and 9B shows an embodiment for practicing the invention by a handicapped person having one hand. FIG. 9A shows a frame 27 having a handle 29 on one end. A pair of wheels 38 are shown on the other end in FIG. 9B. The bag is secured to the frame by an elastic band 25, as shown in FIG. 9B. The bag 10 is secured to the frame 27 enabling the user to grasp the handle 29 and roll the bag 10 back and forth to agitate the fruit.

Figure 10:
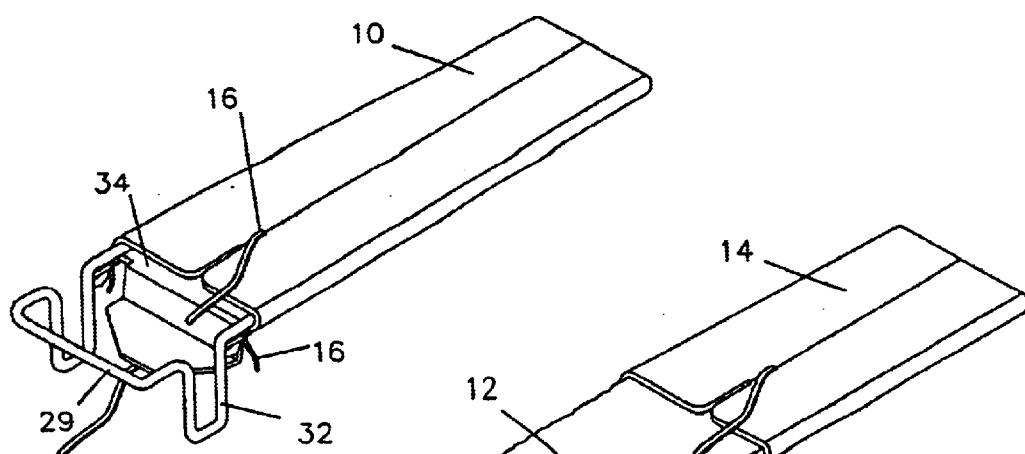
FIGS. 10A, 10B and 10C show the bag with a wire frame.
Figure 10:
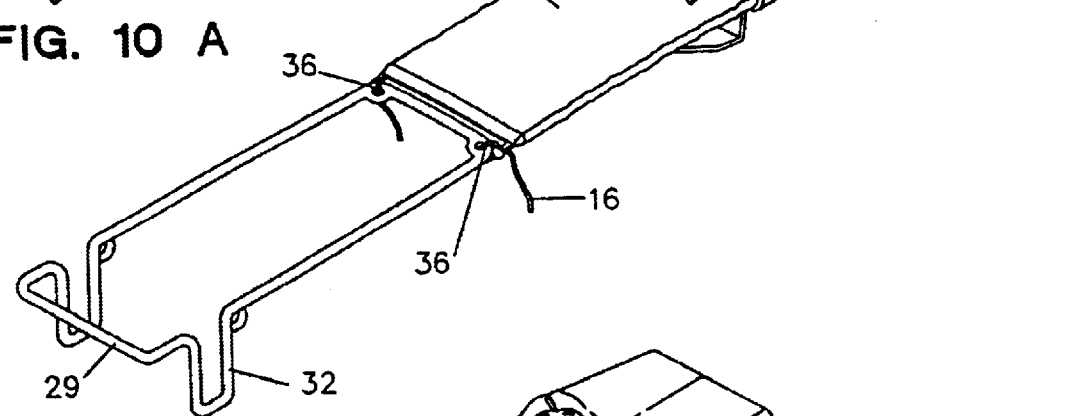
Figure 10:
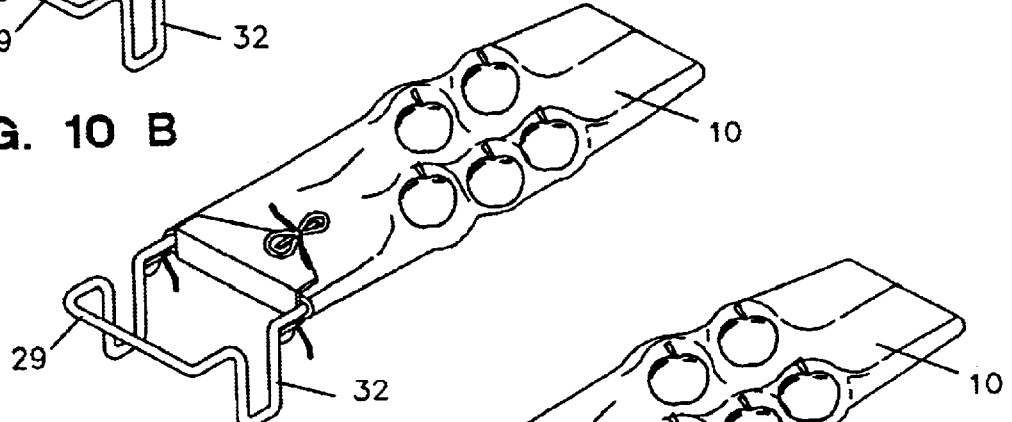

FIG. 10A is another embodiment showing a wire frame 32 inserted through the opening 34 and into the interior and secured to the far end 36 of the bag 10. As shown in FIG. 10B, when it is required to clean the inside of the bag 10, the wire frame 32 is withdrawn thereby pulling the lining and turning the lining inside out for easy access.

FIG. 10C shows that, when product is placed in the bag, the springiness of the wire frame tends to draw the liner around the product thereby augmenting the polishing action of the lining against the product as the bag is oscillated from end to end.

Figure 11:
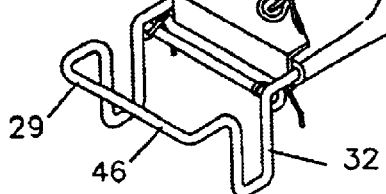
FIG. 11 shows a detail drawing of the bag of FIGS. 10A–C.

FIG. 11 shows a wire frame similar to the frame in figures 10A–10C with the addition of a cross member 46 so that tie strings 48 may be fastened to the cross member 46 close to the opening to secure the bag to the frame.

Figure 12:
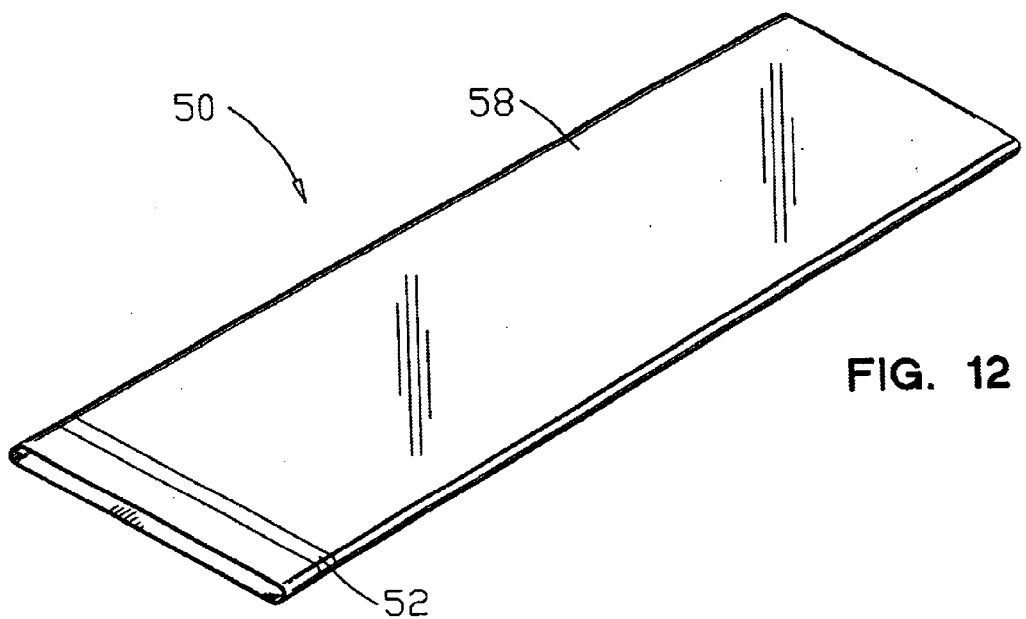
FIG. 12 is a top perspective view of an alternate embodiment of the invention.
Figure 13:
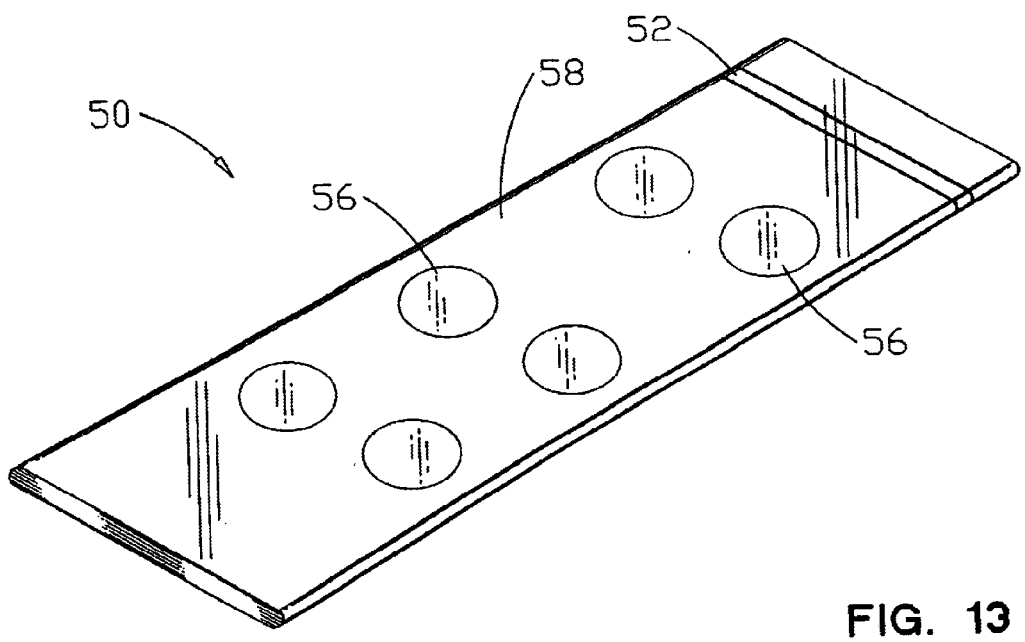
FIG. 13 is a bottom perspective view of the alternate embodiment.

FIG. 12 is a top perspective view, FIG. 13 a bottom perspective view, FIG. 14 a rear view, FIG. 15 a top view, FIG. 16 a front view, FIG. 17 a right side view, and FIG. 18 a bottom view of an alternate embodiment 50 of the invention. In this embodiment 50, the pouch 50 has a closure 52 which is formed of interlocking tongues 54 (shown in detain in FIG. 19). This closure 54 forms a water-tight seal so that while the user is cleaning the products in the fruit cleaner 50 neither water nor debris will exit the pouch 50. During the cleaning process, the user may look through any of the clear windows 56 to determine when the product is clean. In order to form the clear patches 56, the outer bag 58 is formed of a clear material and the inner liner 60 is omitted at the window 56 locations. Alternately, a clear window 56 may be inserted into an opening formed in the outer bag 58 and the inner liner 60. This means that the user does not need to open and reopen the pouch 50 to determine when the cleaning process is complete.

Figure 19:
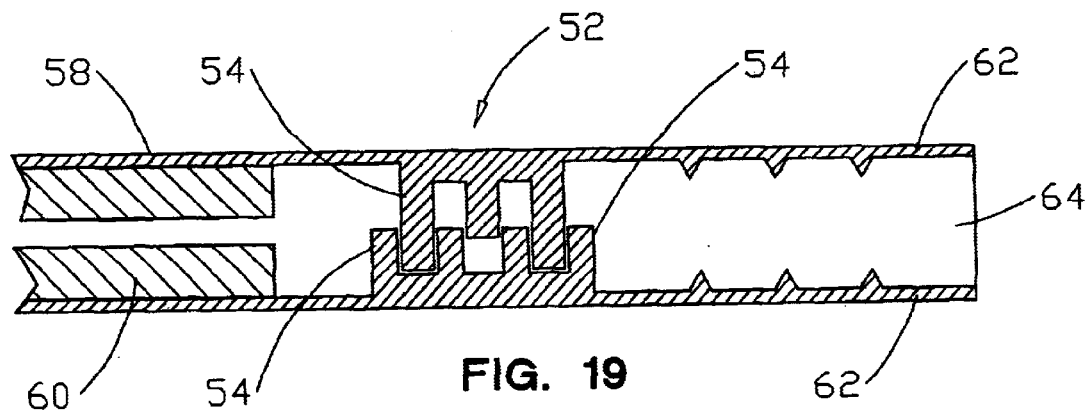
FIG. 19 is an enlarged cross-sectional view of the closure.

FIG. 19 is an enlarged cross-sectional view of the closure 52 of the alternate embodiment 50. A number of semi-rigid, linear projections 54 extend inward around the periphery of the mouth of the pouch. Optimally, the projections 54 are formed of a somewhat flexible plastic material, however, other resilient material may also be used. When pressed together, these projections 54 interlock forming a water-tight barrier. In order to separate the projections 54 the user grasps the edges 62 of the mouth 64 of the pouch 50 and pulls outward, thereby releasing the engagement between the projections 54. Alternate versions of the watertight barrier may also be formed with a tab or other member which is moved along the opening causing the projections 54 to interlock when moved in one direction and release when moved in the other direction.

Figure 20:
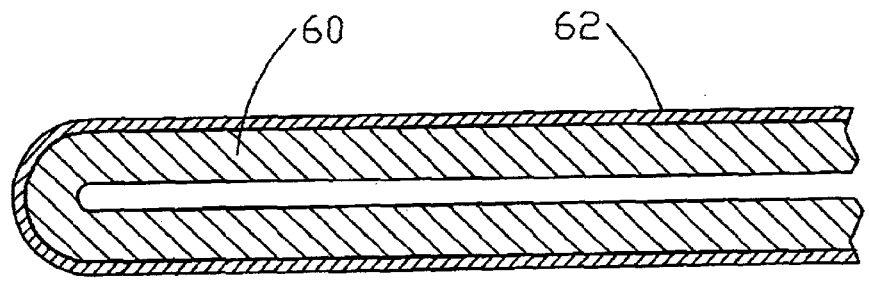
FIG. 20 is an enlarged cross-sectional view of the base.

FIG. 20 is an enlarged cross-sectional view of the base of the fruit cleaner 50. As in previous embodiments, the outer bag 58 is a plastic film, or other relatively durable material. The thickness of the outer bag 58 is preferably in the range of 0.0002 to 0.005 inches, more preferably in the range of 0.0005 to 0.002 inches, most preferably in the range of 0.001 to 0.002 inches. The inner liner 60 is preferably a paper fiber composite such as those described in U.S. Pat. No. 4,144, 866 to Holst; U.S. Pat. No. 5,814,567 to Yahiaoui; U.S. Pat. No. 5,601,542 to Melius; and U.S. Pat. No. 5,284,703 to Everhart, et al., the specifications of which are hereby incorporated by reference in their entirety. The material is preferably sufficiently absorbent to absorb the moisture from the items being cleaned such that the items are not overly wet when removed from the bag. The absorbent material may be a super-absorbent material if additional absorbency is desired. If desired, a pattern, text or other graphic information may be printed onto the inner liner material, thereby allowing instructions or advertisement information to be visible if a clear outer bag 58 is used. The inner liner 60 in this embodiment preferably has a thickness in the range of 0.005 to 0.1 inches, more preferably in the range of 0.01 to 0.1, most preferably in the range of 0.025 to 0.075 inches. Therefore, one layer of the combined outer bag 58 and the inner liner 60 (uncompressed) preferably has a thickness in the range of 0.005 to 0.1 inches, more preferably in the range of 0.01 to 0.1, most preferably in the range of 0.025 to 0.075 inches. In the example given, the thickness of one layer of the outer bag 58 and the inner liner 60 is approximately 0.05 inches. The inner liner 60 may be attached to the outer bag by any suitable means including laminating the layers, adhesive bonding, ultrasonic bonding, thermal bonding, etc.

Figure 21:
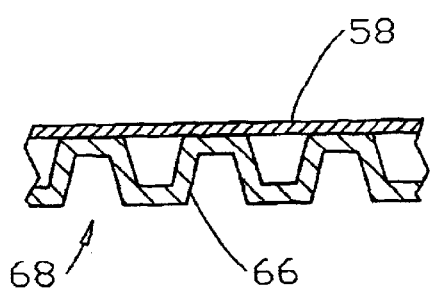
FIG. 21 is an enlarged cross-sectional view of an alternate material.
Figure 22:
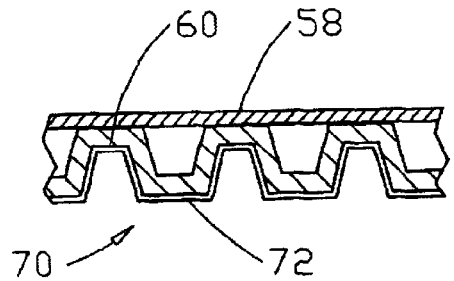
FIG. 22 is an enlarged cross-sectional view of a second alternate material.

FIG. 21 is an enlarged cross-sectional view of an alternate material 68. The inner liner 60 of this embodiment has a rough surface 66 that provides additional surface area of the material 60 to absorb water, thereby absorbing more water more quickly as well as providing projections, which may aid during the cleaning process. The present embodiment has an egg-crate type pattern, however, corrugations or other relief patterns may also be used. FIG. 22 is an enlarged cross-sectional view of a second alternate material 70. In addition to the outer bag 58 and the inner liner 60, a third layer is added to the material described in FIG. 21. The third layer is or has cleansing material 72. This may be a mild detergent for washing purposes, or it may be an antibacterial agent for killing microorganisms. The layers of any of these material may be laminated together.

FIG. 23 shows a further embodiment is formed of two separate pieces: the outer bag 58 and the inner liner 60. A water impermeable material, preferably a plastic film, such as that recited in the description of FIG. 20, forms the outer bag 58 and any of the absorbent paper or fabric composite materials, such as that recited in the description of FIG. 20, either with or without a relief pattern form the inner liner 60. In this manner, the outer bag 58 may be reused by placing a new inner liner 60 into the outer bag 58 prior to each usage. The inner liner 60 may be formed of a material with sufficient stiffness to Its shape within the outer bag 58 or one or more releasable adhesive patches 72 with removable, temporary, protective covers 74 may be used to hold the inner liner 60 in place. Optionally, the inner liner 60 may be formed with viewing windows or ports 56 to allow the user to view the products being cleaned. The inner liner 60 shown is folded with open sides. Alternate versions may be form with a pocket with three attached edges and one open edge. Or the inner liner 60 may be formed of two separate sheets, which are placed into the bag and the products to be cleaned are placed between the sheets. Furthermore, a single sheet could be used leaving the one side exposed to the outer bag 58 if the product to be cleaned is small or in need of little cleaning.

Many features have been listed with particular configurations, options, and embodiments. Any one or more of the features described may be added to or combined with any of the other embodiments or other standard devices to create alternate combinations and embodiments.

In the foregoing paragraphs, embodiments have been disclosed which meet the objects of the invention. Other modifications may be suggested by reading the claims and studying the drawings. The scope of the invention should, therefore, be determined by the following claims and their legal equivalents.

I claim:

1. An apparatus for cleaning and polishing products, including vegetables and fruits, said apparatus comprising:

an elongated outer bag having at least one opening, an inner liner within said outer bag, said inner liner formed of an absorbent material, said inner liner having a thickness within the range of 0.005 to 0.1 inches, means for closing and securing said opening, and at least one viewing port, thereby allowing a user to view the, product being cleaned.

2. The apparatus of claim 1 wherein said inner liner is removable from said outer bag.

3. The apparatus of claim 1 wherein said inner liner is permanently fixed to the interior of said outer bag.

4. The apparatus of claim 3 wherein said closing means is a plurality of interlocking projections forming a water-tight barrier.

5. The apparatus of claim 3 wherein said inner liner has sufficient stiffness to maintain its shape within said outer bag.

6. The apparatus of claim 1 wherein said inner liner has a thickness within the range of 0.01 to 0.1 inches.

7. The apparatus of claim 1 wherein said inner liner has a thickness within the range of 0.025 to 0.75 inches.

8. The apparatus of claim 1 wherein said inner liner has printed material or graphics on a surface thereof.

9. The apparatus of claim 1 wherein a single layer of said outer bag and a single layer of said inner liner have a combined thickness, said combined thickness being within the range of 0.01 to 0.1 inches.

10. The apparatus of claim 9 wherein said combined thickness is in the range of 0.025 to 0.075 inches.

11. An apparatus for cleaning and polishing products, including vegetables and fruits, said apparatus comprising:

an elongated outer bag having at least one opening, an inner liner within said outer bag, said inner liner formed of an absorbent material, said inner liner being removable from said outer bag, said inner liner having a releasable adhesive patch on a surface thereof, and means for closing and securing said opening.

12. The apparatus of claim 11 further comprising a protective cover removably covering said adhesive patch.

13. The apparatus of claim 11 wherein said inner liner has a thickness within the range of 0.01 to 0.1 inches.

14. The apparatus of claim 11 wherein said inner liner has a thickness within the range of 0.025 to 0.75 inches.

15. The apparatus of claim 11 wherein a single layer of said outer bag and a single layer of said inner liner have a combined thickness, said combined thickness being within the range of 0.01 to 0.1 inches.

16. The apparatus of claim 15 wherein said combined thickness is in the range of 0.025 to 0.075 inches.

17. The apparatus of claim 11 wherein said inner liner is formed of a folded sheet of material.

18. The apparatus of claim 11 wherein said outer bag is formed of a plastic film.

19. The apparatus of claim 18 wherein said inner liner has printed material or graphics on a surface thereof.

20. An apparatus for cleaning and polishing products, including vegetables and fruits, said apparatus comprising:

an elongated outer bag having at least one opening, an inner liner within said outer bag, said inner liner formed of an absorbent material, said inner liner being removable from said outer bag said inner liner having at least one viewing port, and means for closing and securing said opening.

21. A removable inner liner for an apparatus for cleaning and polishing products, including vegetables and fruits, said inner liner comprising:

at least one sheet of absorbent material having a thickness within the range of 0.005 to 0.1 inches and an adhesive patch located on a surface of said sheet of material.

22. The apparatus of claim 21 wherein said inner liner has a thickness within the range of 0.01 to 0.1 inches.

and at least one viewing port extending through said sheet of material.

23. The apparatus of claim 21 wherein said inner liner has a thickness within the range of 0.025 to 0.75 inches.

24. A removable inner liner for an apparatus for cleaning and polishing products, including vegetables and fruits, said inner liner comprising:

at least one sheet of absorbent material having a thickness within the range of 0.005 to 0.1 inches and at least one viewing port extending through said sheet of material.

* * * * *